June 9, 1964 F. J. KNESS 3,136,267
AIR TERMINAL CONTROL AND TRAFFIC
Filed Dec. 1, 1959 5 Sheets-Sheet 1

INVENTOR
FRANCIS J. KNESS

BY *Cushman, Darby & Cushman*

ATTORNEYS

June 9, 1964  F. J. KNESS  3,136,267
AIR TERMINAL CONTROL AND TRAFFIC
Filed Dec. 1, 1959  5 Sheets-Sheet 2
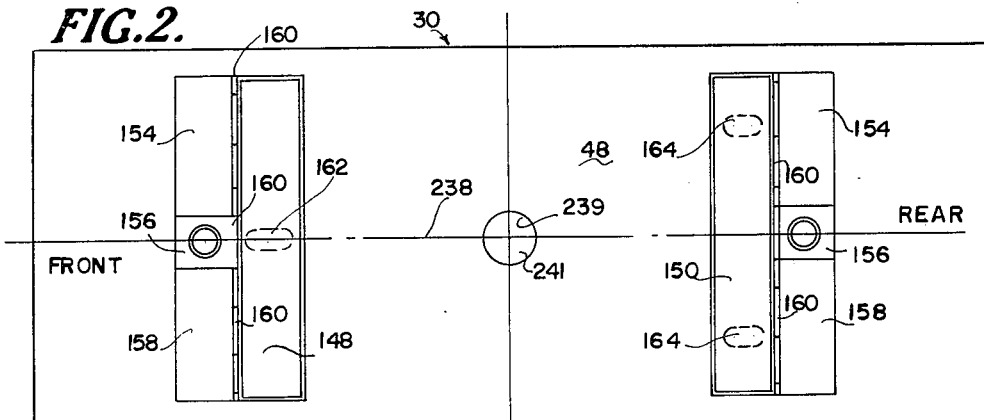
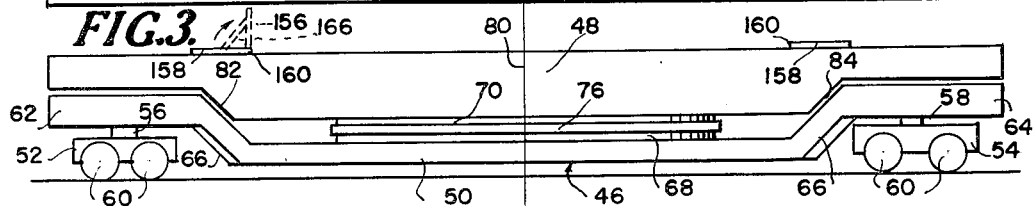
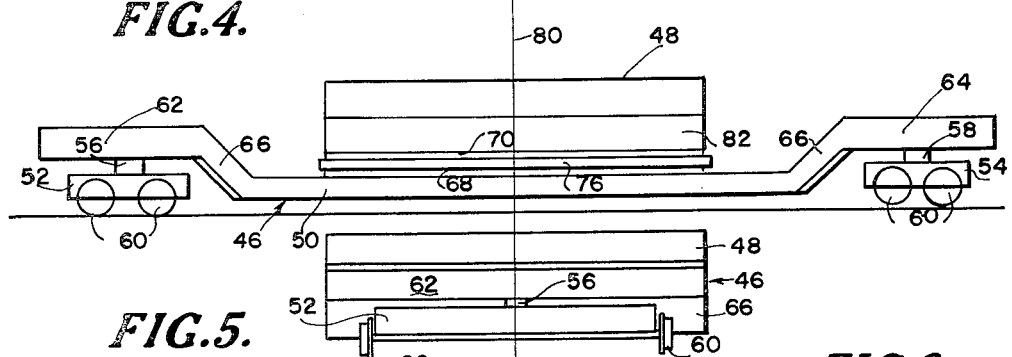
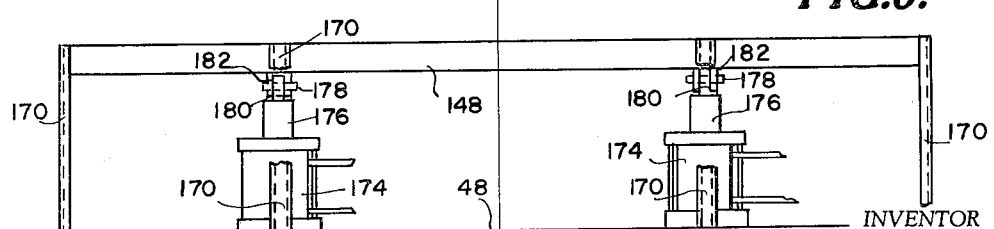
INVENTOR
FRANCIS J. KNESS
BY Cushman, Darby & Cushman
ATTORNEYS June 9, 1964  F. J. KNESS  3,136,267
AIR TERMINAL CONTROL AND TRAFFIC
Filed Dec. 1, 1959  5 Sheets-Sheet 3
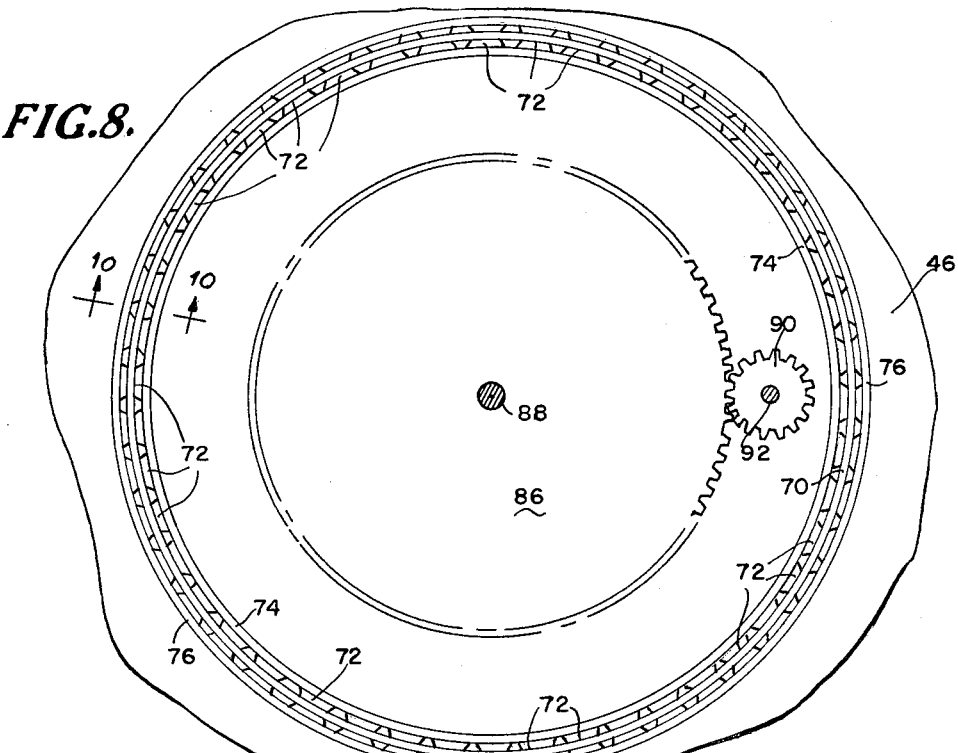
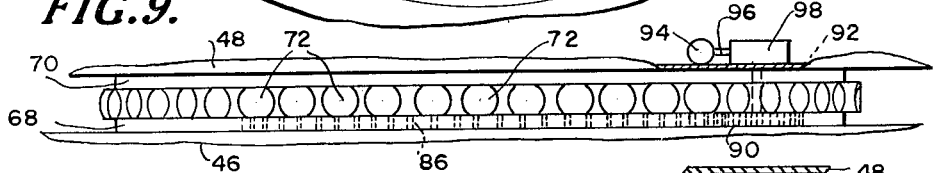
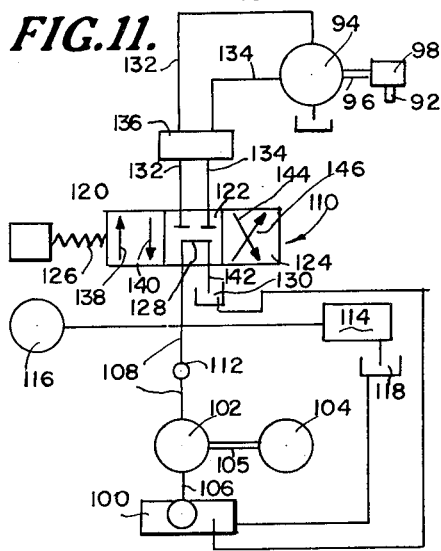
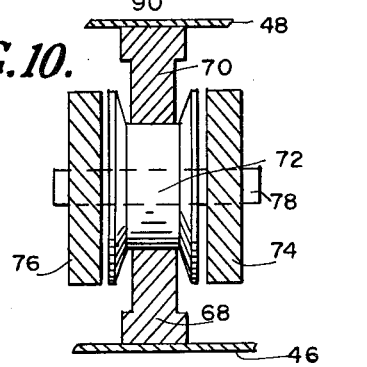
INVENTOR
FRANCIS J. KNESS
BY Cushman, Darby & Cushman
ATTORNEYS June 9, 1964  F. J. KNESS  3,136,267
AIR TERMINAL CONTROL AND TRAFFIC
Filed Dec. 1, 1959  5 Sheets-Sheet 4

INVENTOR
FRANCIS J. KNESS

BY Cushman, Darby
& Cushman
ATTORNEYS

June 9, 1964   F. J. KNESS   3,136,267
AIR TERMINAL CONTROL AND TRAFFIC
Filed Dec. 1, 1959   5 Sheets-Sheet 5
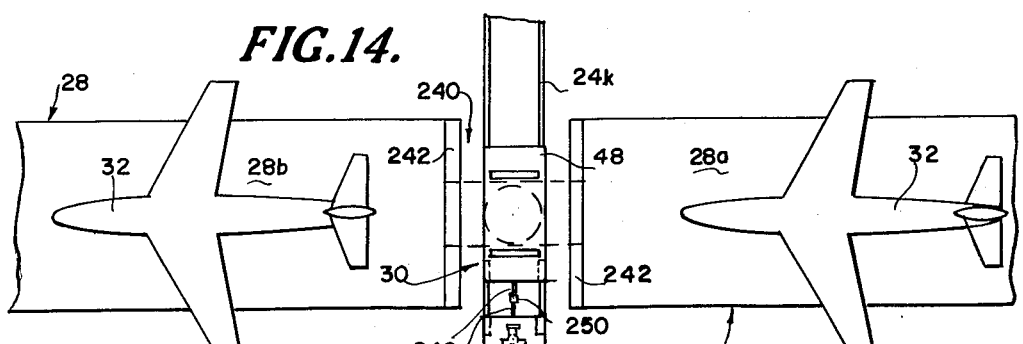
FIG.14.
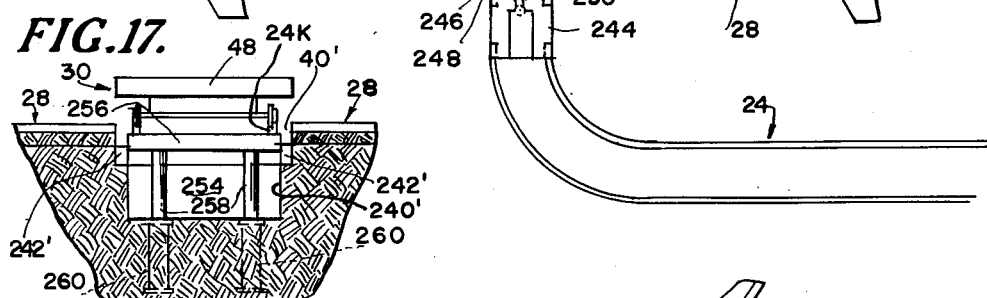
FIG.17.
FIG.15.
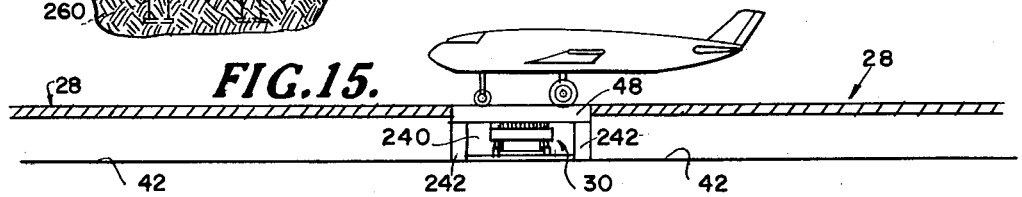
FIG.16.
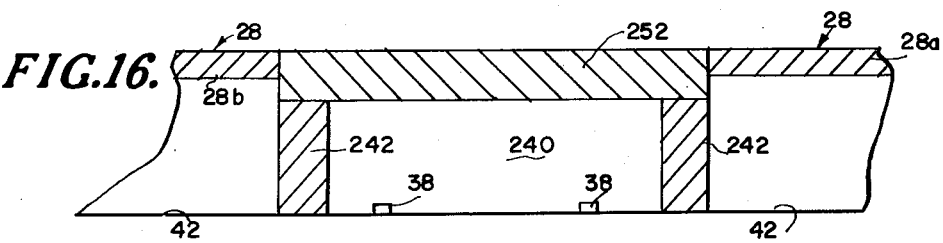
FIG.18.
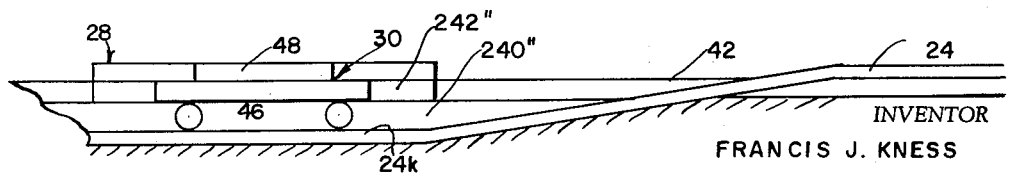
INVENTOR
FRANCIS J. KNESS
BY Cushman, Darby & Cushman
ATTORNEYS United States Patent Office 3,136,267
Patented June 9, 1964

3,136,267
AIR TERMINAL CONTROL AND TRAFFIC
Francis J. Kness, 808 Spring Hill Ave., Mobile 16, Ala.
Filed Dec. 1, 1959, Ser. No. 856,546
23 Claims. (Cl. 104—48)

This invention relates to systems of air terminal traffic and control, and to procedures, structures and equipment related thereto.

The aircraft industry, perhaps more so than any other medium of transportation, has experienced an exceedingly rapid growth since its inception. Recent developments in this industry, particularly in regard to the adoption and use of jet planes for commercial purposes, have aggravated existing problems and difficulties in connection with the loading and unloading of planes at airports, and the movements thereof between the take-off and landing strips, on the one hand, and the loading or unloading zones on the other hand.

Due to the nature and character of air terminals or airports, the operations of loading and unloading aircraft and moving the aircraft between the loading and unloading zones and the landing or take-off strips is extremely time-consuming and expensive, as well as requiring considerable space and equipment, as is well recognized. Furthermore, due to such requirements, it is extremely difficult to enlarge existing airports or air terminals or otherwise adapt them for the handling of certain new airplanes, such as large commercial jet planes currently being used for long-range, non-stop flights. As a result of the foregoing, as well as other serious problems and disadvantages in conventional practices, the construction of airports is a most substantial and expensive undertaking, in some cases, so much so that it is prohibitive, leaving certain communities without adequate air service. Furthermore, the desirable use of the large commercial jet aircraft has been undesirably limited to the relatively few locations near those existing airports that are large enough to handle this type of plane.

Some suggestions have been made in the past to eliminate these and other problems or difficulties. However, for one reason or another, they have not been found to be entirely satisfactory or sufficiently acceptable commercially to be put into use.

Accordingly, the general objectives of the invention are: to provide novel systems, procedures, structures and equipment designed to facilitate and expedite the handling of aircraft, as well as the loading and unloading of passengers and cargo.

A further objective is to provide a novel system for moving aircraft between a landing or take-off strip and a parking zone, and vice versa, and particularly adapted to minimize the time involved in these operations and eliminate the presently necessary costly equipment used in connection therewith. A related and more specific objective resides in the provision of a novel airport construction, including a highly advantageous arrangement of piers or docks with a system of tracks or rails extending between the piers and docks and the landing or take-off strips whereby the aircraft may be efficiently and advantageously transported between the piers or docks and the runways on wheeled carriers, thereby eliminating the problems and difficulties incident, for example, to current taxiing time and its "turn around" requirements.

It is also a highly important and most useful objective of the invention to provide a novel aircraft carrier construction designed to mount aircraft and transport same between the piers and the runways, for example, by the system of tracks referred to, and capable of operating independently of the aircraft engines. Thus, among other things, the wear and tear of aircraft incident to taxiing operations will be eliminated.

A more specific object is to provide an aircraft carrier construction, of the type referred to, and including novel means for receiving and positioning an aircraft thereon. This means is designed so as to receive the wheels of the aircraft, and in the embodiment of the invention to be later described in detail, the carrier is constructed with novel means for weighing aircraft mounted thereon.

Yet another objective of the invention is to design novel arrangements and structures facilitating the mounting of aircraft on the carrier and the removal therefrom.

In accordance with the preferred embodiment of the invention, to be described in more detail hereinbelow, it is broadly contemplated that there be provided a system for moving aircraft between a runway and a parking zone and vice versa comprising: an arrangement of tracks extending between said runway and said zone; a wheeled carrier for receiving and supporting aircraft and movably mounted on said tracks; a source of power operatively connected to said wheeled carrier for moving said carrier along said tracks; and means adjacent said runway providing for the mounting of aircraft on said carrier and removal therefrom.

In the illustrative embodiment of the invention, the parking zone referred to includes a plurality of spaced buildings constituting piers and passenger areas, and the arrangement of tracks includes tracks disposed between adjacent buildings and extending to the runways.

The carrier for receiving and supporting aircraft, as broadly contemplated by the invention, comprises a wheeled base, a platform arranged above said base, means connecting said platform to said base and providing for rotation of said platform relative to said base and about a vertical axis, and means on said platform constructed and arranged to receive the wheels of an aircraft. In the illustrative construction of this carrier, as will be described hereinafter, weighing means are provided in combination with the means to receive the wheels of the aircraft so as to provide for convenient determination of the load being carried by the aircraft.

Further objects and advantages of the invention will be in part obvious and in part pointed out hereinafter.

The novel features of the invention may be best made clear from the following description and accompanying drawings in which:

FIGURE 2 is a plan view of a carrier arrangement embodying the invention and designed to be moved along the tracks shown in FIGURE 1;

FIGURE 3 is a side elevational view of the carrier shown in FIGURE 2;

FIGURE 4 is a view corresponding to FIGURE 3 but showing the platform of the carrier rotated through 90°;

FIGURE 5 is an end elevational view of the carrier of FIGURE 2;

FIGURE 6 is an enlarged elevational view of one of the position plates in the carrier of FIGURE 2, and illustrating an exemplary manner of mounting the position plates for vertical movement;

FIGURE 7 is a fragmentary plan view on reduced scale, showing one of the position plates in the carrier of FIGURE 2, and illustrating an exemplary construction for guiding the vertical movements of the position plates;

FIGURE 8 is an enlarged, fragmentary, plan view of the central region of the base of the carrier shown in FIGURE 2 and illustrating exemplary structure providing for rotation of the platform about a vertical axis and relative to the base;

FIGURE 9 is a fragmentary elevational view of the structure shown in FIGURE 8;

FIGURE 10 is an enlarged vertical sectional view taken generally along line 10—10 of FIGURE 8;

FIGURE 11 is a schematic view illustrating an exemplary hydraulic flow system adapted to be utilized with the turning mechanism shown in FIGURES 8, 9 and 10;

FIGURE 14 is a fragmentary plan view illustrating one arrangement providing for the loading and unloading of aircraft relative to the carrier;

FIGURE 15 is a fragmentary elevational view of the arrangement of FIGURE 14, and showing an aircraft in position on the carrier;

FIGURE 16 is an enlarged view corresponding to FIGURE 15, and showing a cover plate removably arranged over the depression in the runway provided for the tracks and carrier; and FIGURES 17 and 18 are fragmentary elevational views illustrating other arrangements for loading or unloading aircraft relative to the carrier.

Figure 1:
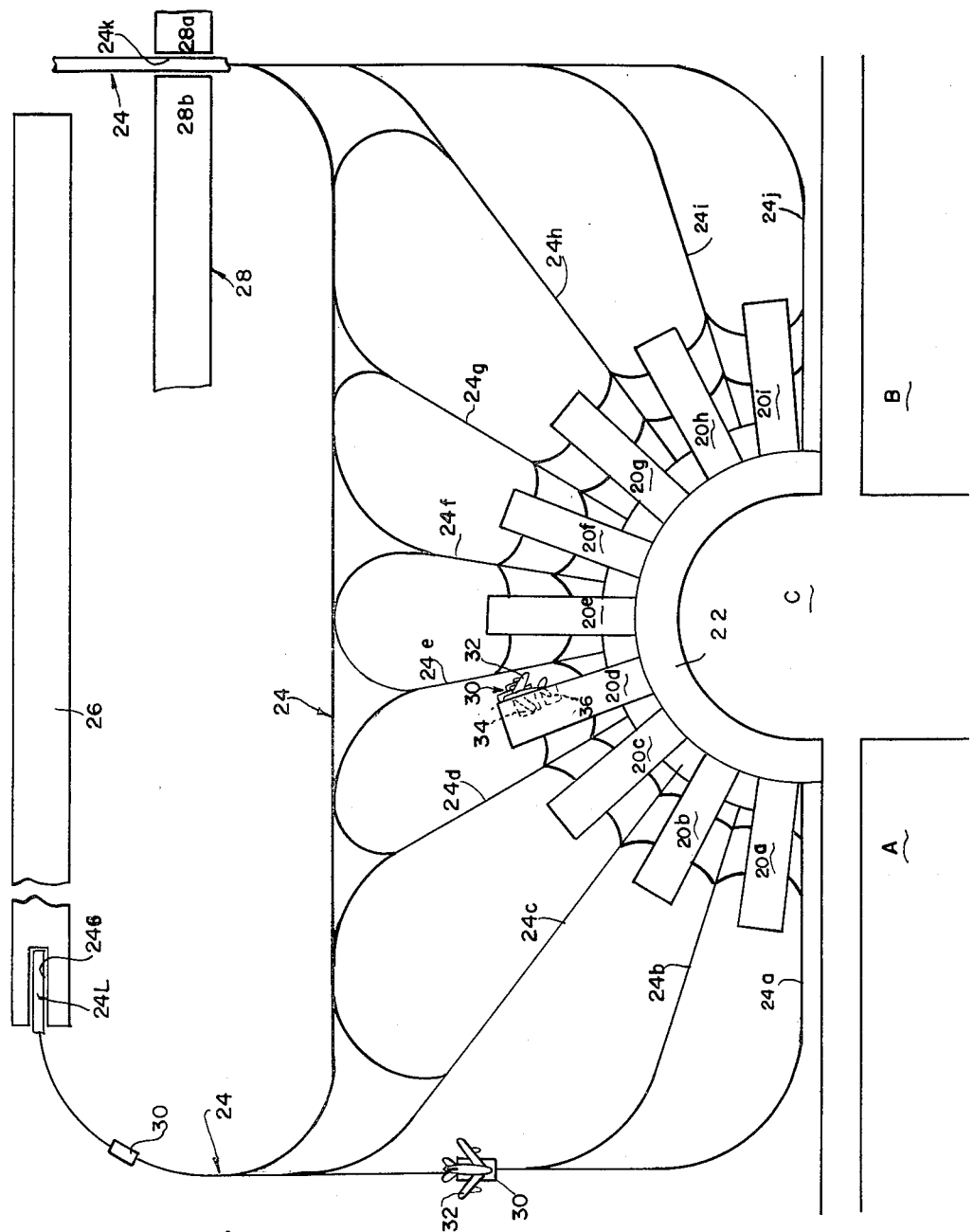
FIGURE 1 is a diagrammatic plan view of an airport design embodying the invention.

Referring more particularly to the drawings, there is shown in FIGURE 1 an exemplary design of an airport or air terminal embodying the invention. In this embodiment the airport is shown as comprising a plurality of spaced and adjacent buildings 20a–20i extending radially outwardly from a generally semi-circular building 22 constituting a concourse. A system of tracks 24 is shown as connecting the spaces between these buildings with the landing or take-off strips 26, 28. According to the invention, it is contemplated that a carrier or carriers 30, to be described in more detail hereinbelow, be provided on tracks 24 for moving aircraft between the buildings 20a–20i, and the landing or take-off strips 26, 28. For convenience, the strips 26, 28 will be sometimes referred to herein as "runways."

Parking areas A, B may be provided outside of the concourse 22, as indicated, while the space between these parking areas and the concourse may be utilized as a vehicle traffic area C.

It will be appreciated that due to the design of the concourse 22 and buildings 20a–20i, the airport may conveniently be constructed in stages, being enlarged as desired. That is to say, in initially constructing the airport, only a few of the buildings, say, buildings 20d, 20e, 20f, may be erected. Thereafter, the remainder of the buildings may be erected, if desired, and according to the particular needs of the airport. Thus, it will be seen that by reason of this design, the airport may be conveniently enlarged or expanded as traffic increases. Furthermore, this design also enables the building size and capacity to be increased by the construction of radial extensions on the free ends or tips of the buildings 20a–20i, as should be evident.

It will be appreciated that modifications may be made to the design and arrangement of the buildings 20a–20i and concourse 22. For example, the concourse 22 may be designed in the shape of three sides of a rectangle or square, with the buildings extending perpendicularly outwardly from one or more of the sides of the concourse, and in spaced relation providing for the positioning of tracks therebetween. Or, the concourse 22 may be designed as to encompass more of a circular area than that shown, or it may be of a horseshoe or racetrack configuration, with the buildings extending outwardly therefrom in spaced relation. Still other modifications of the construction and arrangement of the buildings and concourse are encompassed within the spirit of the invention, as should be evident.

Each of the buildings 20a–20i constitutes a passenger and cargo area, and the track arrangement 24 and carrier 30 are so designed that aircraft may be conveniently moved between the runways 26, 28 and these buildings. As shown, there are individual track sections 24a–24j leading into the spaces adjacent each long side of the buildings 20a–20j, and it is contemplated that smaller sections of track branch off from these sections 24a–24j so as to terminate adjacent the sides of each of the buildings, and extending generally at right angles thereto, as shown.

It should be understood that the system of tracks has been shown schematically in FIGURE 1 as including a single rail throughout. This has been done for convenience and clarity of illustration, due to the small scale on which this figure has been drawn. However, it should be understood that the system of tracks preferably includes two parallel rails throughout, as is convenientionl.

The small branch tracks extending from the sections 24a–24j to the buildings 20a–20i provide for the movement of aircraft 32 into positions adjacent or next to the buildings. As will be explained in more detail hereinbelow, the carrier 30 is so designed that the aircraft carried thereby may be moved about a vertical axis permitting the carrier to bring the aircraft to a position substantially or extremely close to the side of the buildings 20a–20i, and in the orientation thereof shown between the buildings 20d–20e.

In order to receive the aircraft in this position or orientation, it is proposed that the buildings 20a–20i be designed with longitudinally-spaced recesses 34, 36 in the side walls thereof to receive the wing and tail portions of one side of a plurality of aircraft. It is contemplated that these recesses be so arranged that the plane may be received either in the position thereof shown, or in a position 180° therefrom. In certain types of aircraft, for example, the modern large commercial jet airplanes, the tail sections will be at a higher elevation than the wing. For this type of aircraft, it is contemplated that the recesses for the wing be arranged, for example, in the first floor or story, while the recesses for the tail sections will be disposed in the second floor or story. Still referring to this type of airplane, the passenger doors are disposed at an elevation between the elevations of the tail and wing sections, and the buildings 20a–20i will therefore be so designed that when the airplane is docked in position adjacent thereto, the bottom level of the second story of the buildings will be at approximately the same level as the bottom of the doors of the aircraft, wherefore passengers may be conveniently boarded and discharged. In this connection, it will be understood that the design of the carrier 30 will be coordinated with the design of the buildings 20a–20i so that the aircraft, when mounted on the carrier, will be at the proper height for the above-described disposition relative to the buildings 20a–20i.

By reason of this positioning of the aircraft relative to the buildings, it will be apparent that passengers and cargo may be conveniently loaded and unloaded without being exposed to the elements. In this connection, the roofs of these buildings may be constructed so as to overhang or project horizontally from the sides in the form of eaves, whereby to provide additional protection against the weather.

Under some circumstances, it may be advantageous or desirable to provide a roof construction in the form of a canopy or the like joined to and extending between adjacent ones of the buildings 20a–20i, thus sheltering the entire pier or dock area between adjacent buildings.

Any suitable conveyor mechanism (not shown) may be arranged in the buildings 20a–20i for conveying luggage and cargo between the concourse 22 and various pier or docking locations at the buildings. This conveyor mechanism may, for example, be disposed adjacent the ground level in the buildings 20a–20i and clerks may operate at the ground level to transfer the baggage from the conveyors to the aircraft and vice versa. If desired, branch or auxiliary conveyors may be provided in the buildings, extending from positions adjacent the main conveyor to the cargo hatches in the planes for facilitating cargo loading and unloading.

An alternative exemplary arrangement for receiving the wing and tail sections of the aircraft in the buildings 20a–20i would be to provide relatively large openings in the sides of the buildings 20a–20i at the first floor to receive the wing and tail sections, with the second floor of the buildings being disposed above the wing and tail sections, and with a retractable or vertically movable gangplank or the like adapted to be extended from the second floor down to the passenger door(s) of the aircraft.

Although the system of tracks has been shown in FIGURE 1 as communicating with runways 26, 28 that are parallel to each other, it will be appreciated that these runways may be arranged at angles to each other, and the tracks may extend to any desired number thereof, for example, by providing extensions for the tracks, and running to the additional runways.

Figure 13:
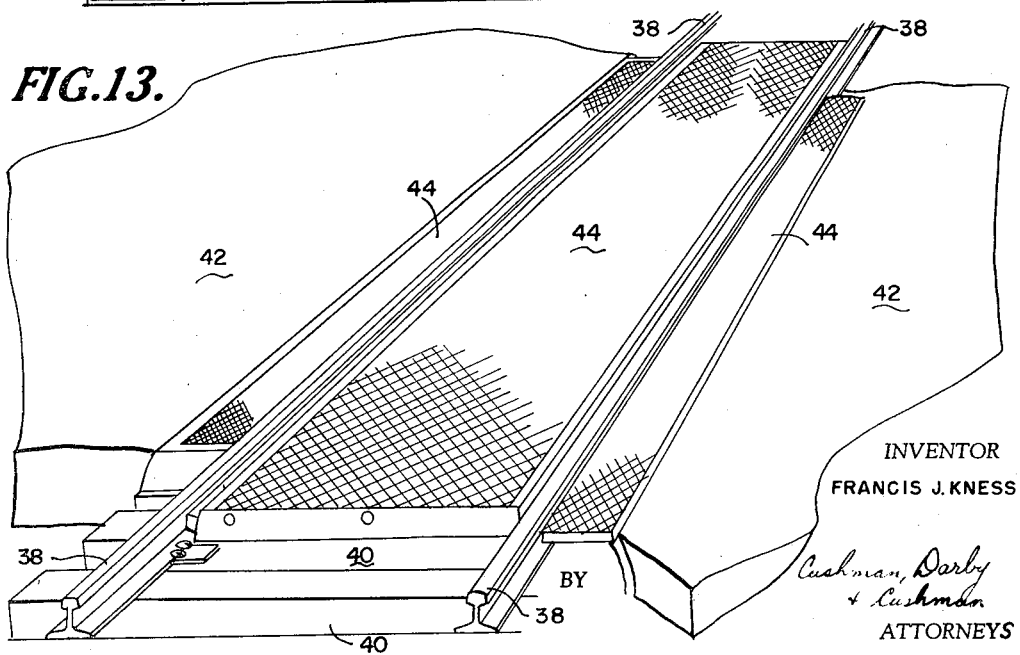
FIGURE 13 is a fragmentary perspective view of an exemplary construction for the tracks shown in FIGURE 1.

The invention contemplates that the carrier 30 and system of tracks 24 be so constructed and arranged as not to interfere with vehicular traffic in the regions of the buildings 20a–20i on runways 26, 28. An example of a suitable track construction is shown in FIGURE 13 wherein rails 30 are secured on ties 40 disposed below the ground level 42, and means, such as the metal plates, 44, are shown as being arranged between the rails 38, 40 and also between each rail and the adjacent ground level, thus providing a substantially flush surface presenting no obstruction to vehicular traffic.

The construction of the carrier 30 will now be described, with particular reference being made to FIGURES 2–12. The illustrative embodiment of the carrier 30, as best seen in FIGURES 2–5, includes a base 46 of suitable construction and a platform or turntable 48 swivelly connected thereto for rotation about a vertical axis and relative to the base. The base 46 is shown as including a centrally depressed section 50 and front 52 and rear 54 wheel carriages are suitably swivelly connected to the base, as by the shaft sections 56, 58. Wheels 60 are journalled to the carriages, 52, 54, and are shown as being of such construction and spacing as to engage the rails 38 of the tracks, as illustrated in FIGURE 13.

The centrally depressed section 50 is joined to front 62 and rear 64 portions of the base 46, as by means of inclined portions 66. These portions 66 are conically, arcuately curved, with the radius of curvature thereof extending from the geometric central vertical axis of the base. In other words, these inclined portions 66 are of an arcuate configuration corresponding to portions of a cone, for example, as indicated in FIGURES 2 and 3. The purpose of this curvature will be apparent as the description proceeds.

The platform or turntable 48, in this embodiment, includes a central portion of increased thickness disposed partially within the depressed region of the base, and the platform is shown as being of substantially the same outline and size in plan view as the base.

The exemplary construction shown for swivelly connecting the platform 48 to the base 46 includes a circular rail or track 68 centrally secured to the top of the base 46, and another circular rail or track 70 centrally secured to the bottom of the platform 48, as best indicated in FIGURES 9 and 10. A plurality of circumferentially spaced rollers 72 are arranged in engagement with these rails 68, 70, these rollers being shown as mounted between inner 74 and outer 76 circular rings, as by pins or axles 78, as shown in FIGURE 10. The construction is such that each of the rollers 72 is rotatable about the horizontal axis extending through its respective axle 78, and relative to the inner 74 and outer 76 rings.

Thus, it should be evident that the platform 48 may rotate about the carrier's central vertical axis, indicated by numeral 80, and relative to the base 46.

The inclined surfaces 82, 84 respectively connecting the front and rear portions of the platform to the enlarged or widened central portion thereof will be of a curvature complementary to the curvature of the confronting inclined portions 66 of the base, whereby the platform may be rotated in the manner discussed, without encountering any obstruction.

An exemplary construction for mechanically effecting this rotation of the platform is illustrated in FIGURES 8 and 9 as including a large gear 86 arranged concentrically within the rail 68, with a shaft 88 extending through this gear, and suitably fixedly attached to the base 46 so as not to rotate. Appropriate structure may be provided for mounting the gear 86 in this position, between the opposing faces of the platform and base. Gear 86 may be fixedly attached to shaft 88 so as not to rotate, while the bottom of this shaft may be journalled in platform 48.

A smaller gear 90 is shown in engagement with the gear 86, drivingly connected to a shaft 92 extending down from the platform 48, and through the bottom wall thereof. This shaft 92 will not be in engagement with the base 46.

Any appropriate means may be utilized for driving the shaft 92. An illustrative arrangement is shown in FIGURES 9 and 11 as including a fluid motor 94 drivingly connected by a shaft 96 to a conventional speed reducer 98, with the shaft 92 constituting the output shaft of the speed reducer. The fluid motor 94 may be of any known reversible construction adapted to rotate the shaft 96 in opposite directions, and is shown in FIGURE 11 as being connected in a hydraulic circuit. This circuit includes a main reservoir 100, a hydraulic pump 102 driven by an electric motor 104 through shaft 105, connected by line 106 to the reservoir, and also connected by line 108 to a reversing valve 110. A one-way check valve 112 is arranged in line 108 for permitting upward flow therethrough, and a relief valve 114 and pressure gauge 116 may be connected into this line, as shown. The relief valve 114 may be of any known construction communicating with an overflow reservoir 118, in turn communicating with the main reservoir 100, as shown.

The reversing valve 110 is a three-position valve shown as including three sections 120, 122, 124, with a spring 126 operating to normally dispose this valve in the position shown. In this position, communication is cut off between the pump 102 and the motor 94, and an inverted U-shaped passageway 128 in the section 122 communicates with the line 108 and a reservoir 130, the latter being in communication with the main reservoir 100, as indicated. Lines 132, 134 extend from the valve 110 to the motor 94, and a relief valve 136 of known construction may be provided in these lines, as indicated, for safety purposes.

When it is desired to operate the fluid motor 94 with line 132 as the inlet thereto and line 134 as the outlet therefrom, the valve 110 will be moved to the right, as viewed in FIGURE 11, until the section 120 is in the position shown in the drawing as being occupied by section 122. Section 120 includes spaced longitudinal bores or passageways 138, 140 adapted to be respectively placed in communication with the lines 132, 134 and lines 108, 142 when in this position, whereby the motor 94 will be operated to drive or rotate the shaft 92 in one direction. When it is desired to rotate this shaft in the opposite direction, the valve 110 is moved to the left until the section 124 is in the position of section 122 shown in the drawing. This section 124 includes inclined and spaced passageways 144, 146 which will then be in communication respectively with the lines 132, 134 and lines 142, 108 whereby fluid from line 108 will pass through passageway 146, and then through line 134, motor 94, line 132, passageway 144, and back to the reservoir 100 through line 142, and auxiliary reservoir 130.

The above described hydraulic system may be arranged in any desired manner and location. For example, it may be positioned within the platform 48.

The carrier 30 is of sufficiently strong and rugged construction as to mount thereon diverse aircraft, including the largest commercial jet airliner currently in use. It is contemplated by this invention that novel means be provided on the carrier for mounting and retaining aircraft thereon in proper position, and it is further contemplated that a novel arrangement be provided for weighing aircraft when so mounted on the platform, as indicated hereinabove.

The means designated to locate and retain aircraft in proper position on the carrier 30 is shown in the illustrative embodiment as including front 148 and rear 150 position plates (see FIGURES 2, 3, 6 and 7). These position plates are of elongated rectangular shape, and are spaced apart the same distance as the front and rear landing wheels or gear of the aircraft to be mounted thereon. A plurality of plates 154, 156, 158 are hingedly mounted on the platform 48 outwardly of and adjacent to these position plates 148, 150. These plates 154, 156, 158 may be separately movable or pivotable upwardly about their respective horizontal hinge axes 160 so as to engage against the landing gear on the position plates and prevent movements thereof. In this connection, it will be observed that the left and right-hand sides of the platform 48, shown in FIGURE 2, are identical so that a plane may be mounted on the carrier from either the front or rear directions, that is, the aircraft may move in a forward direction onto the carrier from either the left or the right-hand side of the carrier, as viewed in FIGURE 2.

For example, in mounting the carrier 30 from the right-hand side thereof, the front or nose wheel 162 will be located centrally on the position plate 148, while the rear wheels 164 will be located on the position plate 150, as indicated in phantom in FIGURE 2. In this position, the front or left-hand plate 156 may be pivoted upwardly until it is disposed in a substantially vertical position, for example, as indicated in dotted lines in FIGURE 3, and any appropriate means may be provided for holding this (as well as the other plates 154, 158) in such a vertical position. For example, a brace or strut member 166 may be pivoted to the rear of these plates 154, 156, 158 and adapted to be engaged to the platform 48 to retain these plates in desired elevated positions. For this purpose, toothed racks (not shown) or similar structure may be provided on the platform 48 to be engaged by the lower end of the braces on the rear of these plates 154, 156, 158.

Still referring to the exemplary arrangement of wheels shown in phantom in FIGURE 2, the right-hand or rear plates 154, 158 may be elevated so as to be disposed in a locked and substantially vertical position to the rear of the rear wheels 164. Thus, the plane will be effectively retained in proper position on the carrier.

The plates 154, 156, 158 may be pivoted or swung through approximately 180° so as to entirely cover the position plates 148, 150, as should be apparent. As shown, they are designed in each set of a combined length and width corresponding to the length and width of the adjacent position plate. Thus, in mounting an airplane thereon, for example, with its wheels arranged in the position shown in FIGURE 2, the left-hand plates 154, 158 may initially be rotated or swung through 180° so as to expose only the central region of the position plate 148; while the right-hand plate 156 may be initially swung through 180° so as to cover the corresponding central region of the rear or right-hand position plate 150, before the aircraft is arranged on the platform.

An exemplary construction providing for weighing aircraft on the carrier 30 will now be described. The position plates 148, 150 are mounted for vertical movement in the platform 48, and means in the form of a hydraulic system is operatively connected to these position plates and also to scales to indicate the weight of aircraft on the position plates. The structure shown for permitting vertical movement of the position plates includes a plurality of vertical semi-circular guides 168 carried by the platform in stationary position and disposed at locations spaced around the periphery of each of the position plates for example, as shown in FIGURES 6 and 7. A plurality of complementarily shaped guide elements 170 are carried by each of the position plates 148, 150 and are slidably mounted in these guides 168, as indicated.

Figure 12:
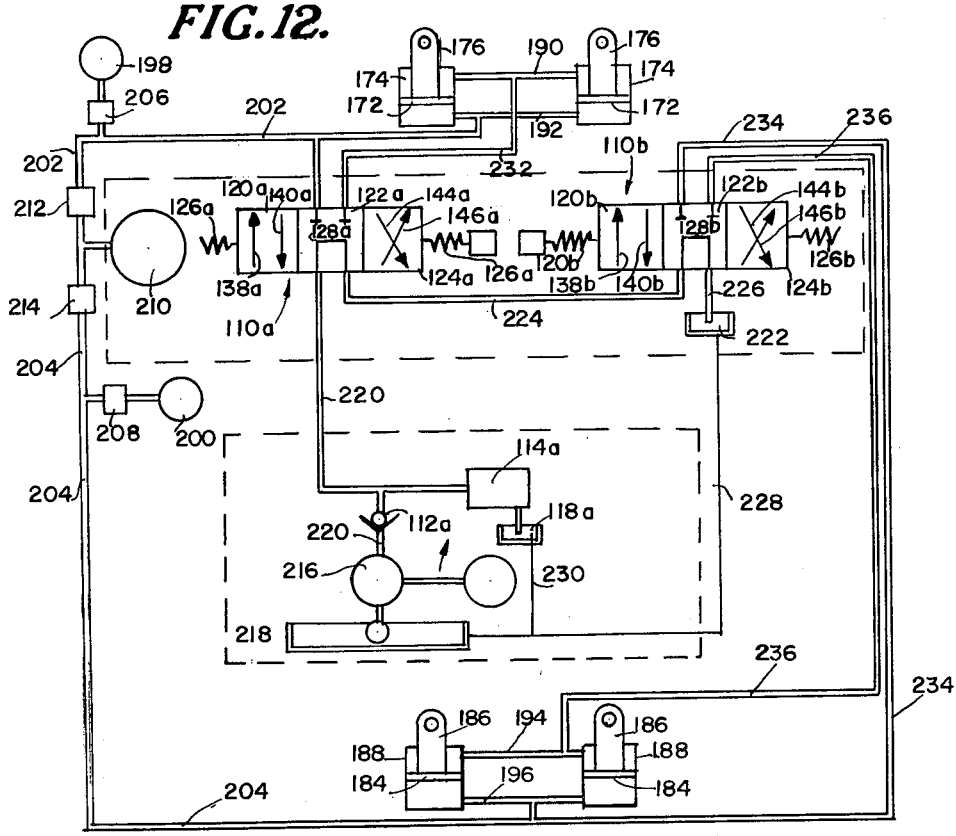
FIGURE 12 is a schematic view illustrating an exemplary hydraulic arrangement for controlling the movements of the position plates of the carrier shown in FIGURE 2, and also providing for the weighing of loads arranged on these position plates.

The exemplary hydraulic system connected to these plates 148, 150, as referred to, is illustrated in FIGURES 6 and 12, and includes a pair of pistons 172 slidably arranged in cylinders 174 and attached to piston rods 176 extending through the upper ends of the cylinders and connected to the front position plate 148 as by pins 178 extending through lugs 180 on the piston rods, and lugs 182 extending downwardly from the position plate 148 as best seen in FIGURE 6. The cylinders 174 will be mounted in stationary position within the platform 48, as by being engaged to the bottom wall thereof, as indicated in FIGURE 6. Similar structure including pistons 184, piston rods 186 and cylinders 188 will be similarly arranged in relation to position plate 150.

The exemplary hydraulic circuit shown in FIGURE 12 is operable to lower the position plates or to raise the same to a level coplanar with the top of the platform 48. As shown in FIGURE 12, line 190 communicates with the top of cylinders 174, and line 192 communicates with the bottom of these cylinders while lines 194, 196 are respectively in communication with the upper and lower portions of the cylinders 188. These lines 190, 192 and 194, 196 are open to their respective cylinders on opposite sides of the pistons 172, 184 as will be evident. Scales 198, 200 in the form of hydraulic gauges are respectively connected for communication with the lines 192, 196 as by the fluid lines 202, 204. On-off valves 206, 208 are respectively arranged in the lines connecting these scales to the lines 202, 204. These scales are calibrated to read in pounds, their calibration being determined, for example, by the size or surface area of the bottoms of the pistons 172, 184 acting on the fluid within the cylinders. Lines 202, 204 are shown as being connected to a hydraulic gauge 210, also calibrated to read in pounds so as to function as a scale. On-off valves 212, 214 are respectively provided in lines 202, 204, between the scales 198, 200, and the scale 210.

Thus, if it is desired to determine the weight of the aircraft on both plates 148, 150, the valves 206, 208 will be closed, and the valves 212, 214 opened whereby the weight of the aircraft will force the pistons attached to the plates 148, 150 against the fluid therebeneath in the cylinders 174, 188. This increased pressure of the fluid is transmitted to the gauge or scale 210 to give the desired reading or measurement. Similarly, if it is desired to determine the weight on only one of the plates 148, 150, valves 212, 214 will be closed, and either valve 206 or valve 208 opened, depending on whether it is desired to determine the weight on plate 148 or plate 150, as will be evident.

It is contemplated that during such weighing operations, the hydraulic system operate to prevent lowering of the plates 148, 150 under the weight of the aircraft, except as occasioned by the slight compressibility of the hydraulic liquid. However, the hydraulic system is designed so as to permit lowering of these plates when desired. For this purpose, a hydraulic pump 216 is provided in communication with a main liquid reservoir 218, and also with the cylinders 174, 188 through reversing valves 110a, 110b. These valves 110a, 110b are shown as being of a construction similar to the valve 110 described above, and accordingly, similar reference numerals have been used to designate similar sections and parts thereof. Springs 126a, 126b are arranged on opposite sides of these valves for normally disposing them in the positions shown wherein the line 220 leading from the pump 216 communicates with auxiliary reservoir 222 through the inverted U-shaped passageways 128a, 128b in valves 110a, 110b, respectively, and the lines 224, 226. The reservoir 222 is in communication with reservoir 218 as by line 228. A one-way check valve 112a is provided in the line 220 permitting flow from the pump 216 to valve 110a and a conventional relief valve 114a may be placed in communication with this line 220, as shown, and dumping into the auxiliary reservoir 118a, which communicates with the main reservoir 218 as by line 230.

When it is desired to raise or lower the position plates 148, 150, the valves 206, 208, 212 and 214, will be closed. It is contemplated that the plates 148, 150 be raised or lowered one at a time, by the arrangement shown. Thus, if it is desired to raise plate 148, valve 110b will remain in the position thereof shown, and valve 110a will be moved to the right until section 120a thereof is in the position of section 122a shown in FIGURE 12, wherein pump 216 will operate to deliver hydraulic fluid through the line 220, bore 138a of valve section 120a, line 202 and line 192 into the cylinders 174 underneath the pistons 172. Liquid will discharge from the upper portions of the cylinders 174 through the line 190, line 232, bore 140a in valve section 120a, and into the auxiliary reservoir 222 through the lines 224, 226 and valve passageway 128b.

To raise position plate 150, valve 110a will be in the position shown and valve 110b will be moved to the right so that section 120b thereof will be in the position of section 122b shown in the drawing, whereby bores 138b, 140b will be respectively in communication at one end with lines 234, 236 and at their other end with lines 224, 226 so that operation of the pump 216 will deliver hydraulic fluid to the lower portions of cylinders 188 to elevate the pistons therein. The liquid forced out of the upper portions of the cylinders during this movement of the pistons will be returned through lines 194, 236, bore 140b, and line 226 to the reservoir 222.

The operation or actuation of these valves 110a, 110b will be reversed when it is desired to lower the position plates 148, 150, as should be evident. Such lowering of the position plates may be desirable, for example, in order to provide additional assurance against movement of the aircraft on the carrier. Thus, to lower position plate 148, valve 110a will be moved to the left until the section 124a thereof is in the position of section 122a shown in the drawing, while valve 110b remains in its illustrated position. Bores 144a, 146a of section 124a will then be respectively in communication with lines 224, 220 at one end, and with lines 202, 232 respectively at the other end whereby operation of the pump 216 will be effective to deliver liquid to the upper portions of the cylinders 174 to force the pistons 172 downwardly, causing liquid to leave the lower portions of the cylinders and pass through bore 144a, line 224, passageway 128b, line 226 and to the reservoir 222.

When it is desired to lower plate 150, valve 110a will be in the position thereof shown in the drawing, while valve 110b will be moved to the left to bring the bores 144b, 146b of section 124b in communication at their upper ends with lines 234, 236 respectively, and at their lower ends with lines 226, 224, respectively. Operation of the pump 216 will then produce lowering of the pistons 184, as will be apparent.

When carrying out a weighing operation, it will be apparent that the valves 110a, 110b will be in the positions thereof shown in FIGURE 12, and valves 206, 208, 212 and 214 will be manipulated as discussed above, to obtain the desired weighings.

The hydraulic system shown in FIGURE 12 may be arranged in any convenient location in the carrier, for example, it may be contained within the platform 48 or suitably attached thereto.

It should be appreciated that the hydraulic systems of FIGURES 11 and 12 have been shown and described for illustrative purposes only, and other appropriate means may be substituted therefor in order to accomplish the same results.

If desired, the position plate 150 may be constructed of two separate sections, one on one side of the longitudinal center line 238 of the carrier, and the other section on the other side of the center line. In such a construction, when the aircraft is arranged on the carrier, for example, with its landing gear in the positions thereof shown in phantom in FIGURE 2, the two rear wheels 164 of the aircraft will be on the separate sections of the rear position plate 150. The pistons 184 and cylinders 188 connected to these sections of the rear plate 150 may be suitably connected to the scale 200 by separate lines connected to the cylinders below the pistons, and with an appropriate valve in each of such lines, whereby the latitudinal distribution of weight in an aircraft may be determined. Similarly, the front plate 148 may be constructed in such separate sections so as to enable the same determinations to be made in the case where the aircraft is mounted on the carrier with its front or nose wheel 162 on the rear plate 150 and with its rear wheels 164 on the two sections of the front plate 148.

A relatively large hole 239 may be formed in the top of the platform 48, normally closed by a removable cover or lid 241, and providing access to the interior of the platform.

Some exemplary arrangements for loading aircraft onto the carrier 30, and permitting removal therefrom adjacent the runways 26, 28 will now be described. FIGURES 14, 15 and 16 illustrate one such arrangement wherein a section of tracks 24k extends transversely across the runway 28, for example, at the right hand end thereof shown in FIGURE 1. In this arrangement, the runway 28 is at a higher elevation than the ground level 42, with the track section 24k being disposed in a trench or depression 240 formed in the runway 28, as shown. In mounting or loading an aircraft onto the carrier 30, the carrier will be moved to the approximate position thereof shown in FIGURE 14, and the platform 48 will be rotated or turned until it is disposed approximately at a right angle to the base 46 of the carrier, as indicated in phantom lines of FIGURE 14 and as shown in FIGURE 15. Parallel supporting ledges 242 are provided along each side of the trench 240 and are arranged so as to provide support for the platform 48 when the latter is rotated to the position thereof shown in FIGURE 15. Thus, as the aircraft is moved from the right runway section 28a shown in FIGURE 14 onto the carrier, the support ledges 242 will prevent the carrier from toppling. Likewise, when removing an aircraft from the carrier in this arrangement, there will be no toppling of the carrier. After the aircraft is mounted on the carrier by this structure and method, the platfom 48 may then then be turned or rotated to a position parallel to or coextensive with the base 46, and the carrier may then be moved, for example, to one of the buildings 20a–20i.

A towing vehicle 244 is shown in FIGURE 14 as being connected to the carrier 30 as by the shafts 246, 248 swivelly or universally connected together, as at joint 250. It will be understood, however, that the carrier 30 may be provided with a self-contained power source, such as, for example, an internal combustion engine or a battery driven electric motor, capable of moving the carrier in either forward or reverse directions.

After the aircraft has been mounted on the carrier and moved away from the strip 28, a cover 252 may be placed on the supporting ledges 242 in order to cover the trench 240, and provide a flat, safe surface for the runway in this region, as shown in FIGURE 16.

It will be appreciated that, if desired, the sections of the runway 28a, 28b on opposite sides of the trench 240 may be inclined upwardly toward this trench and the remainder of the runway 28 may be at the same elevation as the ground 42, with only those portions of the runway at 28a, 28b being inclined in order to provide a gradual grade adapted to be easily negotiated by an aircraft on its own power, and enabling the aircraft to be conveniently and safely boarded or mounted on the carrier 30, and removed therefrom in the manner indicated in FIGURES 14 and 15, and discussed above.

FIGURE 17 shows an arrangement where the runway 28 is on the same level as the ground 42, and means are provided for raising or lowering the carrier 30 adjacent the runway to accommodate boarding and unboarding operations. As shown, a trench 240' is formed in the runway 28, and a pit 254 is excavated in the ground below the trench 240'. An elevator 256 is shown as being mounted on piston rods 258 carrying pistons at their lower ends reciprocably mounted in cylinders 260, with, for example, a suitable hydraulic system being provided for raising or lowering the piston rods 258 in order to raise or lower the elevator 256.

A section of the track 24k is mounted on the elevator 256, and is movable therewith, as indicated. The elevator 256 will normally be in the position shown in FIGURE 17 wherein the track section 24k will be substantially at ground level, and in alignment with the incoming and outgoing tracks on opposite sides thereof. Thus, when it is desired to mount an aircraft on the carrier 30, the carrier will be moved onto the track section 24k on the elevator 256, and the elevator and track section will thereafter be lowered, with the carrier thereon, until such time as the platform 48 is at substantially the same level as the runway 28. The platform 48 will be rotated or turned so as to be substantially perpendicular to the base 46 of the carrier, and parallel supporting ledges 242' are shown as being provided along the opposite long sides of the trench 240' for the purpose of supporting the platform 48 when so rotated, as should be apparent.

After an aircraft has been mounted on the carrier by the method and structure indicated in FIGURE 17, the elevator 256 will then be raised so that the track section 24k will be at the same level as the remainder of the tracks, and the carrier 30 will be moved away from the runway, for example, to bring the aircraft to one of the buildings 20a–20i.

Another arrangement for mounting aircraft on the carrier 30 is shown in FIGURE 18. In that arrangement, the track section 24k is sunk into a pit 240" below the ground level adjacent the runway 28, with the track section 24k being disposed substantially at right angles to the longitudinal direction of the runway 28. The carrier 30 is shown in FIGURE 18 in position to receive an aircraft thereon, or to permit removal of an aircraft therefrom. In this position, the platform 48 is disposed at right angles to the base 46, and supporting ledges 242" may be provided along opposite sides of the pit 240" as in the previously described arrangements, for the purpose of engaging the platform and preventing the carrier from toppling when an aircraft is mounted thereon or removed therefrom.

A still further arrangement is indicated in FIGURE 1 in connection with runway 26. As there shown, a longitudinal recess or trench 246 is formed at one end of the runway 26, with the track section 24L extending centrally thereinto. Thus, the carrier 30 may be moved directly into this trench 246, with the platform 48 in its normal position coextensive to the base 46, as indicated, and the aircraft may then move directly onto the carrier. The loaded carrier will then be moved away from the runway to a desired location.

If desired, a plurality of carriers 30, for example, three, may be arranged one in front of the other, in the recess 246, so that the first aircraft will be mounted on the outermost carrier and then moved away from the runway, the next aircraft will be mounted on the second carrier and then moved from the runway, and so on. Likewise, in bringing aircraft to the runway 26, the first carrier in the recess 246 may be left in its innermost position therein, while other carriers move into other locations in this same recess 246, bringing additional aircraft to the runway for takeoff purposes. It will be understood that when a plurality of carriers are arranged in trench 246, one in front of the other, they provide an extended platform over which the aircraft may move or be moved.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

What is claimed is:

1. Aircraft handling system comprising: an aircraft runway access area; a parking zone; an arrangement of tracks extending between said runway area and said parking zone; a wheeled carrier having a longitudinal axis and operative for movement along said tracks with its axis in alignment with said tracks, said carrier including means for receiving and supporting an aircraft with the longitudinal axis of the aircraft in substantial alignment with the longitudinal axis of said carrier; a source of motive power operatively connected to said wheeled carrier for moving said carrier along said tracks; and means cooperatively positioned with respect to said tracks adjacent said runway area for loading the aircraft onto said carrier from said runway area and vice versa.

2. The system defined in claim 1 wherein said parking zone includes a plurality of spaced buildings constituting piers and passenger areas, and further wherein said arrangement of tracks includes branch tracks extending between adjacent buildings.

3. The system defined in claim 1 wherein said means for the loading and unloading of aircraft from and to said wheeled carrier includes means for disposing the upper surface of said carrier at substantially the same level as said runway.

4. The system defined in claim 3 wherein said loading and unloading means includes a portion of said tracks in the region of said runway extending generally perpendicular to the longitudinal axis of said carrier.

5. The system defined in claim 1 wherein said track arrangement is substantially at ground level and includes a main track and a plurality of branch tracks joined to said main track in curvilinear relationship, the opposite ends of said branch tracks terminating at said parking zone.

6. In an airport, in combination, a runway access area, a parking zone, an aircraft terminal of permanent construction positioned adjacent said parking zone, an arrangement of tracks extending between said runway area and said zone, said track arrangement including a main track, and a plurality of branch tracks connected to said main track in curvilinear relationship therewith, the opposite ends of said branch tracks terminating in said parking zone adjacent said terminal, said terminal including a plurality of buildings extending between said branch tracks.

7. The system defined in claim 6 wherein said buildings are joined together at their inner ends and terminate in free ends.

8. The system defined in claim 7 wherein said buildings extend in generally radial directions from approximately the same central point.

9. The combination defined in claim 6 wherein at least some of said branch tracks are of generally U-shaped configuration, the curved portion of said U-shaped branch tracks intersecting said main track.

10. The combination defined in claim 6 wherein said tracks are disposed substantially at ground level, and including a wheeled carrier operative for movement along said tracks, means on said wheeled carrier for receiving and supporting an aircraft in substantially aligned relationship with the longitudinal axis of said wheeled carrier so that the wings of the aircraft extend transversely with respect to said carrier; a source of motive power operatively connected to said carrier to move the carrier along said track; and means at the runway area of said track for transferring an aircraft from said carrier to said runway and vice versa.

11. The combination defined in claim 10 wherein said carrier includes a platform constructed and arranged to receive the wheels of an aircraft from either end thereof, and means providing rotation of said platform relative to said carrier about a substantially vertical axis to orient the position of the aircraft.

12. The combination defined in claim 11 including means carried by said carrier for weighing an aircraft carried on said platform.

13. Method of handling aircraft between a parking zone and a runway access area wherein a main track and a plurality of branch tracks extend between said area and said zone, including the steps of: transferring the aircraft from the area onto a wheeled carrier, orienting the aircraft substantially in longitudinal alignment with respect to said carrier, moving said carrier along a selected track to said parking zone for cargo transferring purposes and the like, and moving said carrier along a selected track to said area, and transferring the aircraft from said carrier to said area.

14. Method defined in claim 13 including the step of re-orienting the longitudinal axis of the aircraft while on said carrier.

15. A system for moving aircraft from or to a runway and a position remote from said runway comprising: an arrangement of tracks extending between said runway and said remote position; a wheeled carrier for receiving and supporting aircraft and movably mounted on said tracks; a source of power operatively connected to said carrier; said carrier including a base and a platform mounted on said base; means on said platform constructed and arranged to receive the wheels of an aircraft; and means providing for the loading of aircraft on and unloading of aircraft from said carrier at said runway and including means adjacent said runway for disposing the upper surface of said platform at substantially the same level as said runway.

16. The system defined in claim 15 wherein said loading and unloading means comprises having a portion of said track arrangement adjacent said runway disposed parallel thereto.

17. The system defined in claim 15 wherein means are provided swivelly connecting said platform to said base for rotation of said platform about a vertical axis and relative to said base, and further wherein said loading and unloading means comprises having a portion of said tracks in the region of said runway disposed generally perpendicularly thereto.

18. A carrier for receiving, supporting and weighing aircraft comprising: a wheeled base; a platform arranged above said base; means on said platform constructed and arranged to receive the wheels of an aircraft, said means including a plurality of horizontal plates, said plates being mounted in said platform for vertical movement, and weighing means operatively connected to said plates.

19. The structure defined in claim 18 wherein means are provided connecting said platform to said base for rotation of said platform relative to said base and about a vertical axis.

20. The structure defined in claim 19 wherein said weighing means includes at least one piston engaged to and extending downwardly from each of said plates, a cylinder arranged in stationary position below said plates and surrounding said piston, and a hydraulic control system operatively connected to said cylinder and said piston to raise or lower said plates or to hold them in substantially stationary position against the weight of the aircraft.

21. Aircraft carrier comprising: base means including wheels operative for movement along spaced apart parallel tracks; platform means arranged above said base means for receiving and supporting the aircraft; means for rotating said platform means relative to said base means about a substantially vertical axis to orient the position of an aircraft carried thereby; and means on said platform constructed and arranged to receive the wheels of an aircraft from either end of said platform.

22. Carrier defined in claim 21 further including weighing means cooperatively associated with said wheel receiving means to simultaneously weigh an aircraft while on said platform means.

23. A system for handling aircraft between a runway access area and a parking zone comprising: an arrangement of tracks constructed adjacent portions of said runway area and extending to said zone; wheeled carrier means movably mounted on said tracks and having a longitudinal axis substantially coinciding with the path of movement thereof for receiving and supporting aircraft with the aircraft axis substantially aligned with said carrier axis; a source of motive power operatively connected to said carrier means; said carrier means including platform means; first and second means extending upwardly from said platform means for receiving the front and rear wheels respectively of the aircraft; means adjacent said runway for disposing said wheel-receiving means at substantially the same level as said runway area for receiving the aircraft thereon; and means operatively connected to said first and second wheel-receiving means for raising and lowering one with respect to the other and for weighing the aircraft, whereby the aircraft is maintained in a level position during cargo handling and the aircraft is weighed while supported on said carrier.

References Cited in the file of this patent

UNITED STATES PATENTS

| | | |
|---|---|---|
| 1,369,387 | Brigham | Feb. 22, 1921 |
| 1,387,863 | Otis | Aug. 16, 1921 |
| 1,537,162 | Fowler | May 12, 1925 |
| 1,689,160 | Siegrist | Oct. 23, 1928 |
| 1,800,789 | Gervais | Apr. 14, 1931 |
| 1,909,724 | Schellentrager | May 16, 1933 |
| 2,196,468 | Minty | Apr. 9, 1940 |
| 2,244,598 | Ash | June 3, 1941 |
| 2,246,543 | Smith | June 24, 1941 |
| 2,487,613 | Stone | Nov. 8, 1949 |
| 2,542,847 | Turnbull | Feb. 20, 1951 |
| 2,700,937 | Bock | Feb. 1, 1955 |
| 2,750,135 | Anderson | June 12, 1956 |
| 2,778,674 | Attendu | Jan. 22, 1957 |
| 2,933,053 | Mellam | Apr. 19, 1960 |